(12) United States Patent
Rijsman

(10) Patent No.: US 9,706,014 B1
(45) Date of Patent: *Jul. 11, 2017

(54) ROUTING PROTOCOL INTERFACE FOR GENERALIZED DATA DISTRIBUTION

(71) Applicant: Juniper Networks, Inc., Sunnyvale, CA (US)

(72) Inventor: Bruno Rijsman, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,544

(22) Filed: Aug. 10, 2015

Related U.S. Application Data

(63) Continuation of application No. 13/547,978, filed on Jul. 12, 2012, now Pat. No. 9,137,116.

(51) Int. Cl.
*H04L 12/28* (2006.01)
*H04L 29/06* (2006.01)
(Continued)

(52) U.S. Cl.
CPC ............ *H04L 69/08* (2013.01); *H04L 49/351* (2013.01); *H04L 67/10* (2013.01); *H04L 67/2823* (2013.01)

(58) Field of Classification Search
CPC ....... H04L 69/08; H04L 49/351; H04L 67/10; H04L 67/2823
(Continued)

(56) References Cited

U.S. PATENT DOCUMENTS

| 5,519,704 A | 5/1996 | Farinacci et al. |
| 7,499,459 B1 | 3/2009 | Scudder |

(Continued)

FOREIGN PATENT DOCUMENTS

WO  2006071901 A2  7/2006

OTHER PUBLICATIONS

U.S. Appl. No. 14/616,474, entitled "Dynamically Generating Application-Layer Traffic Optimization Protocol Endpoint Attributes," filed Feb. 6, 2015.
(Continued)

*Primary Examiner* — Mang Yeung
(74) *Attorney, Agent, or Firm* — Shumaker & Sieffert, P.A.

(57) ABSTRACT

In general, techniques are described for defining an interface to a network router software infrastructure that allows developers to dynamically extend a routing protocol executed by the network router to distribute data throughout the routing domain for use with custom applications. In some examples, a routing protocol process executing on a control plane of a network device may expose an interface, such as an Application Programming Interface (API), that defines methods and parameters for extending the operation of a routing protocol executed by the routing protocol process. Third-party developers may then build custom applications that invoke the interface of the routing protocol process to define new routing protocol messages or message payloads, inject application-specific data into the routing protocol process for distribution within the newly defined messages/payloads, and extract application-specific data that is carried by newly defined messages/payloads that are originated by another network device in the routing domain.

20 Claims, 7 Drawing Sheets

(51) Int. Cl.
*H04L 29/08* (2006.01)
*H04L 12/931* (2013.01)

(58) Field of Classification Search
USPC .......................................................... 370/254
See application file for complete search history.

(56) References Cited

U.S. PATENT DOCUMENTS

| | | | |
|---|---|---|---|
| 7,710,899 B1 | 5/2010 | Ward | |
| 8,255,382 B2 | 8/2012 | Carpenter et al. | |
| 8,606,847 B2 | 12/2013 | Raghunath et al. | |
| 8,688,775 B2 | 4/2014 | Penno et al. | |
| 8,700,801 B2 | 4/2014 | Medved et al. | |
| 8,738,766 B1 | 5/2014 | Kazerani et al. | |
| 8,799,419 B1 | 8/2014 | Lin et al. | |
| 8,909,736 B1 | 12/2014 | Bosch et al. | |
| 8,924,508 B1 | 12/2014 | Medved et al. | |
| 8,954,491 B1 | 2/2015 | Medved et al. | |
| 8,959,139 B2 | 2/2015 | Medved et al. | |
| 9,137,116 B1 | 9/2015 | Rijsman | |
| 2002/0009079 A1 | 1/2002 | Jungck et al. | |
| 2003/0105865 A1 | 6/2003 | McCanne et al. | |
| 2003/0208472 A1 | 11/2003 | Pham | |
| 2004/0107177 A1 | 6/2004 | Covill et al. | |
| 2004/0196827 A1 | 10/2004 | Xu et al. | |
| 2004/0205235 A1 | 10/2004 | Matsuhira | |
| 2004/0260755 A1 | 12/2004 | Bardzil et al. | |
| 2005/0175341 A1 | 8/2005 | Ovadia | |
| 2006/0020684 A1 | 1/2006 | Mukherjee et al. | |
| 2006/0182034 A1 | 8/2006 | Klinker et al. | |
| 2007/0097991 A1* | 5/2007 | Tatman | H04L 12/4641 370/395.53 |
| 2007/0286093 A1 | 12/2007 | Cai et al. | |
| 2008/0170578 A1 | 7/2008 | Ould-Brahim | |
| 2008/0222291 A1 | 9/2008 | Weller et al. | |
| 2008/0304482 A1 | 12/2008 | Grassi et al. | |
| 2009/0190518 A1 | 7/2009 | Kim et al. | |
| 2010/0114867 A1 | 5/2010 | Olston | |
| 2010/0125649 A1 | 5/2010 | Day et al. | |
| 2011/0231515 A1 | 9/2011 | Day et al. | |
| 2012/0144066 A1 | 6/2012 | Medved et al. | |
| 2012/0198022 A1 | 8/2012 | Black et al. | |
| 2012/0198361 A1 | 8/2012 | Ganimasty et al. | |
| 2012/0224506 A1 | 9/2012 | Gredler et al. | |
| 2013/0041972 A1 | 2/2013 | Field et al. | |

OTHER PUBLICATIONS

"Developing Innovative Embedded Applications in the Network with the Junos SDK," Juniper Networks, Inc., www.juniper.net, Nov. 2011, 16 pp.

Roh et al., "Design of a Content Replacement Scheme Using the P-based LRFU-k Algorithm in Contents Delivery Networks," Advanced Communication Technology, 2008, ICACT 2008, 10th International Conference on, vol. 3, No., Feb. 17-20, 2008, pp. 206, 2070.

Alimi et al., "ALTO Protocol: drafl-ielf-alto-protocol-06.txt," ALTO Working Group, the Internet Engineering Task Force draft, Oct. 25, 2010, 65 pp.

Bates et al., "Multiprotocol Extensions for BGP-4," Network Working Group, RFC 2858, Jun. 2000, 12 pp.

Bates et al., "Multiprotocol Extensions for BGP-4," Network Working Group, RFC 4760, Jan. 2007, 12 pp.

Berger et al., "The OSPF Opaque LSA Option," Network Working Group, RFC 5250, Jul. 2008, 17 pp.

Chandra et al., "BGP Communities Attribute," Network Working Group, RFC: 1997, Aug. 1996, 5 pp.

Coppens, et al., "Design and Performance of a Self-Organizing Adaptive Content Distribution Network," Network Operations and Management Symposium, 2006. NOMS 2006. 10th IEEE/IFIP, Apr. 2006, 12 pp.

Ginsberg et al., "Advertising Generic Information in IS-IS," draft-ielf-isis-genapp-04.1xt, Network Working Group, Nov. 10, 2010, 13 pp.

Gredler et al., "North-Bound Distribution of Link-State and TE Information using BGP," draft-gredler-idr-ls-distribution-01, Inter-Domain Routing, Mar. 12, 2012, 31 pp.

Seedorf et al., "Application-Layer Traffic Optimization (ALTO) Problem Statement," Network Working Group, RFC 5693, Oct. 2009, 14 pp.

Moy, "OSPF Version 2," Network Working Group, RFC 2328, Apr. 1998, 204 pp.

Oran, "OSI IS-IS Intra-domain Routing Protocol," Network Working Group, RFC 1142, Feb. 1990, 157 pp.

Penno et al., "ALTO and Content Delivery Networks," Network Working Group, draft-penno-alto-cdn-03, Mar. 14, 2011, 28 pp.

Prosecution History from U.S. Appl. No. 13/547,978, dated Jul. 12, 2012 through Mar. 11, 2015, 54 pp.

Prosecution History from U.S. Appl. No. 13/547,917, dated Dec. 23, 2013 through Aug. 15, 2014, 86 pp.

Prosecution History from U.S. Appl. No. 14/562,917, dated Jul. 2, 2015 through Oct. 22, 2015, 47 pp.

U.S. Appl. No. 14/562,052, by Hendrikus G.P. Bosch, filed Dec. 5, 2014.

Office Action from U.S. Appl. No. 15/012,638, dated Oct. 6, 2016, 27 pp.

Final Rejection from U.S. Appl. No. 15/012,638, dated Feb. 10, 2017, 22 pp.

Amendment in Response to Office Action mailed Oct. 6, 2016, from U.S. Appl. No. 15/012,638, filed Jan. 5, 2017, 10 pp.

Cain et al., "Request Routing Requirements for Content Internetworking," Internet Draft, draft-cain-request-routing-req-00.txt, Jan. 2001, 31 pp.

Zahariadis et al., "Catalogue of Advanced Use Cases for Content Delivery Network Interconnection," Internet Engineering Task Force, Internet Draft, draft-fmn-cdni-advanced-use-cases-00, Oct. 24, 2011, 14 pp.

* cited by examiner

ROUTING PROTOCOL INTERFACE FOR GENERALIZED DATA DISTRIBUTION

This application is a continuation of U.S. patent application Ser. No. 13/547,978, filed Jul. 12, 2012, the entire content of which is incorporated herein by reference.

TECHNICAL FIELD

The invention relates to computer networks and, more particularly, to computer network routing protocols.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

Although primarily used by network routers for distributing Internal Protocol (IP) version 4 (IPv4) reachability information within and among autonomous systems to facilitate network layer routing, network router vendors have modified BGP to execute within their network routers to distribute reachability information for other standardized network layer protocols, including IP version 6 (IPv6), Layer 3 Virtual Private Networks (L3VPNs), Layer 2 VPN (L2VPNs), traffic engineering using BGP with Traffic Engineering extensions (BGP-TE), and application-layer traffic optimization (ALTO). In general, to utilize BGP with a new network application, a network router vendor modifies the BGP protocol software executed by the router to associate a new address family with a new network application and also define a data representation, in the form of Network Layer Reachability Information (NLRI) for the new address family. The network router vendor then produces updated executable software based on the modified BGP protocol software and releases the updated executable software to their customers for a software upgrade of control plane software executing on the routing engine of the customers' routers. Only after completing the rigorous testing, release and installation of the updated BGP software can the routers then utilize the newly-defined address family by executing the modified BGP protocol software to exchange BGP messages and use the NRLI distributed therein in the new network application.

SUMMARY

In general, techniques are described for defining an interface to a network router software infrastructure that allows developers to dynamically extend a routing protocol executed by the network router to distribute any form of data throughout the routing domain for use with custom applications. For example, a routing protocol process executing on a control plane of a router or other network device may expose an interface, such as an Application Programming Interface (API), that defines methods and parameters for extending the operation of a routing protocol executed by the routing protocol process. Third-party developers may then build custom applications that invoke the interface of the routing protocol process to register new address families, define new routing protocol messages or message payloads, inject application-specific data into the routing protocol process for distribution within the newly defined messages/payloads, and extract application-specific data that is carried by newly defined messages/payloads that are originated by another network device in the routing domain. As a result, custom applications may multiplex their respective application-specific data in the routing plane of a network for distribution to custom applications executing on other routers. Moreover, the custom applications may be installed and deployed within the control plane of routers without requiring a service upgrade to the routing protocol software installed on the routers.

Exposing the routing protocol process in this way may enable both vendor and third-party developers to dynamically utilize a network routing protocol for generalized data distribution without requiring modification and upgrade to the routing protocol process. For the vendor, this may enable the routing protocol process and application development teams to decouple, at least to some extent, their respective development processes and improve innovation and time to market by reducing the resources and team coordination required to produce a stable application that uses an extension to a routing protocol. Similarly, third-party developers may use techniques described herein to develop custom applications independently of the network router vendor to improve and/or extend operations of a third-party network, for example, without having to enlist the vendor to perform application-specific modifications to the routing protocol process of the network device. In addition, by utilizing an existing routing protocol having an exposed interface to distribute application-specific data, the techniques may facilitate reliable, scalable, loop-free, and generalized data distribution throughout the network.

In one example, a method includes storing a set of one or more predefined databases each associated with a different one of a set of one or more predefined address family identifiers for a routing protocol. The method also includes executing a routing protocol process with a network device to exchange routing protocol advertisements with a peer network device in accordance with the routing protocol, wherein one or more of the routing protocol advertisements each specifies one of the predefined address family identifiers and includes information associated with the predefined database that is associated with the predefined address family identifier specified in the routing protocol advertisement. The method further includes executing an application with the network device. The method also includes invoking an interface of the routing protocol process with the application to dynamically extend the routing protocol process to register a new address family identifier for the routing protocol. The method further includes, in response to receiving the new address family identifier via the interface, dynamically creating a new database and associating the new address family identifier with the new database.

In another example, a network device includes a control unit comprising one or more processors, one or more interface cards, and a routing protocol process to execute on the control unit to exchange routing protocol advertisements with a peer network device using the interface cards in accordance with a routing protocol. The network device also includes a set of one or more predefined databases each associated with a different one of a set of one or more predefined address family identifiers for the routing protocol, wherein the routing protocol process exchanges, with a peer network device in accordance with the routing protocol, routing protocol advertisements, wherein one or more of the routing protocol advertisements each specifies one of the predefined address family identifiers and includes information associated with the predefined database that is associated with the predefined address family identifier specified in the routing protocol advertisement. The network device also includes an application to execute on the control unit and address family configuration data. The network device further includes an interface of the routing protocol process invoked by the application to dynamically extend the routing protocol process to register a new address family identifier for the routing protocol, wherein in response to receiving the new address family identifier via the interface, the interface of the routing protocol process dynamically creates a new database and associates the new address family identifier with the new database in the address family configuration data.

In another example, a non-transitory computer-readable storage medium contains instructions. The instructions cause one or more programmable processors to store a set of one or more predefined databases each associated with a different one of a set of one or more predefined address family identifiers for a routing protocol. The instructions also cause the processors to execute a routing protocol process with a network device to exchange routing protocol advertisements with a peer network device in accordance with the routing protocol, wherein one or more of the routing protocol advertisements each specifies one of the predefined address family identifiers and includes information associated with the predefined database that is associated with the predefined address family identifier specified in the routing protocol advertisement. The instructions further cause the processors to execute an application with the network device, invoke an interface of the routing protocol process with the application to dynamically extend the routing protocol process to register a new address family identifier for the routing protocol and, in response to receiving the new address family identifier via the interface, dynamically create a new database and associating the new address family identifier with the new database.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
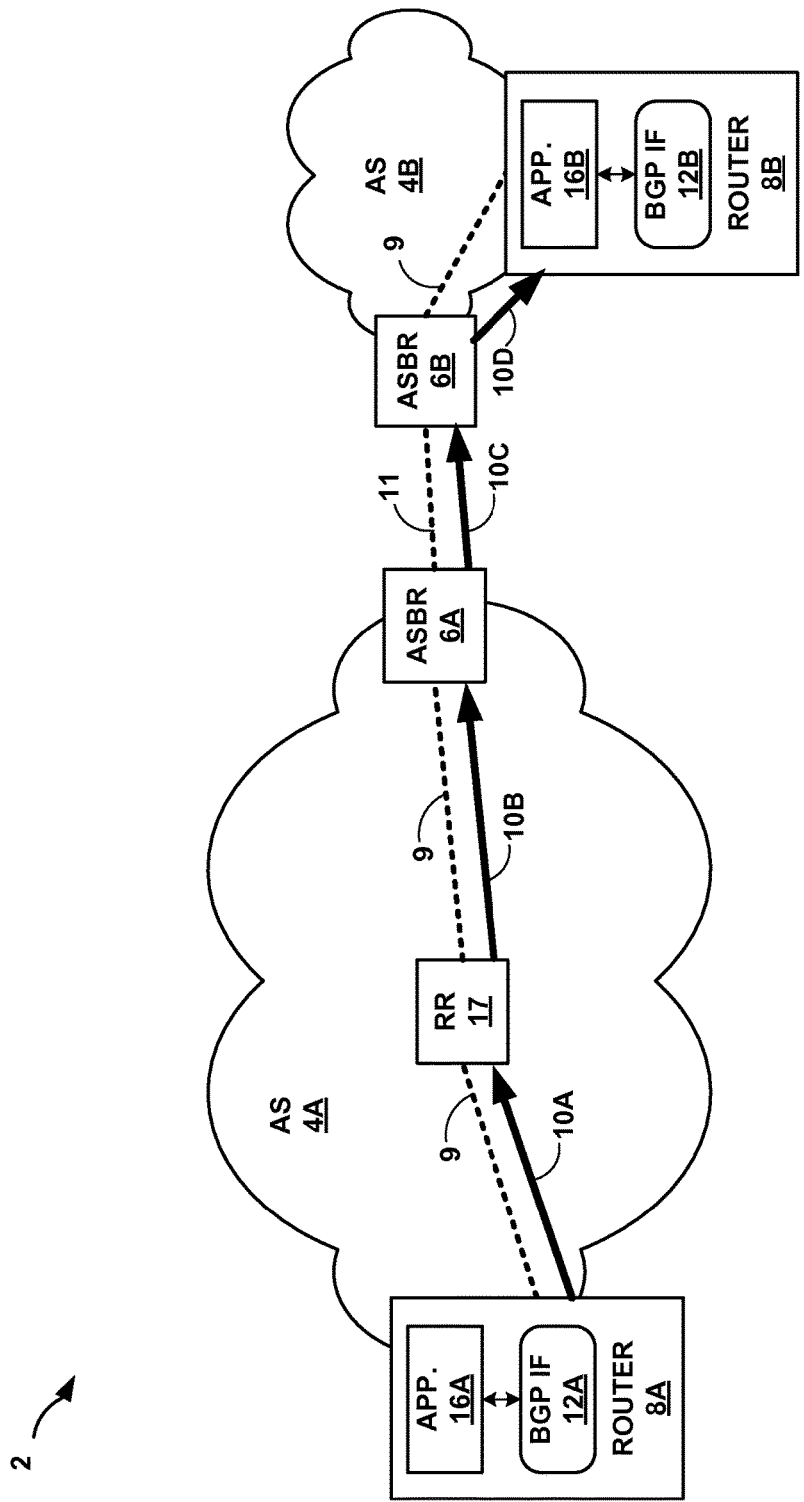
FIG. 1 is a block diagram illustrating a network system including routers to distribute application data using an interface to an extensible routing protocol according to techniques described herein.

FIG. 1 is a block diagram illustrating a network system including routers to distribute application data using an interface to an extensible routing protocol according to techniques described herein. Network system 2 includes autonomous systems 4A-4B (illustrated as "ASes 4A-4B" and collectively referred to herein as "autonomous systems 4") interconnected by an external communication links. The term "communication link," as used herein, comprises any form of transport medium, wired or wireless, and can include intermediate nodes such as network devices. Network system 2 may in some instances represent the Internet or any other publicly accessible computer network, a private network, or a virtual private network (VPN).

Each of autonomous systems 4 runs one or more interior gateway protocols (IGPs), such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP), and each of autonomous systems 4 includes a set of one or more routers operating within a single administrative domain according to a routing policy. Autonomous systems 4 each have an identification number provided by an Internet registry or by an Internet service provider (ISP) that uniquely identifies the autonomous system to other autonomous systems. In some instances, the identification number may be drawn from a private identifier number space and therefore unique only within a private network comprising ASes 4. In various embodiments, each of autonomous systems 4 may represent a service provider network, an enterprise or campus network, a content access network (CAN), or a content delivery network (CDN), for example. In addition, one or more service providers, content provider, or enterprise/campus network administrators may administer any one or more of autonomous systems 4.

Routers of autonomous systems 4 implement a routing protocol to route packets from a source network addresses to destination network addresses, and each of autonomous system 4 may offer network packet delivery to a network (or subnet) of one or more endpoints identified by a network address prefix that encompasses the network address range defined by the network addresses of endpoints. Although the techniques of this disclosure may be applied with respect to multiple different routing protocols, the techniques are generally described hereinafter with respect to Multiprotocol BGP (MP-BGP), a routing protocol that defines extensions to BGP for IPv4 (i.e., BGP-4) for carrying routing information for multiple different network layer protocols. MP-BGP overloads BGP routing protocol advertisements with attributes that define Network Layer Reachability Information (NLRI) that routers of ASes 4 may use to advertise routing information associated with multiple different network layer protocols. Routers of ASes 4 specify, for each multiprotocol NRLI included in a BGP routing protocol advertisement, an address family identifier that is associated with a network layer protocol. For example, a multiprotocol NLRI carried in a BGP routing protocol advertisement may specify an address family identifier for IPv4, in which case the multiprotocol NLRI carries routing information, e.g., routes, for IPv4. An example description of a type of MP-BGP is included in T. Bates et al., "Multiprotocol Extensions for BGP-4," Request for Comments 4760, Network Working Group, Internet Engineering Task Force, January, 2007, which is incorporated by reference herein in its entirety (hereinafter referred to as "RFC 4760"). Multiprotocol NLRI may represent the Multiprotocol Reachable NLRI (MP_REACH_NLRI) and Multiprotocol Unreachable NLRI (MP_UNREACH_NLRI) described in Bates et al., referenced above. An "address family identifier" (uncapitalized) may represent a combination of an Address Family Identifier (AFI) and a Subsequent AFI (SAFI) in Multiprotocol Reachable and Multiprotocol Unreachable NLRI, as described in RFC 4760.

In the illustrated example, AS 4A and AS 4B include respective autonomous system boundary routers 6A-6B ("ASBRs 6") that connect AS 4A with AS 4B over a communication link. ASBRs 6 execute BGP to exchange, in external BGP peering session 11 routing information for respective autonomous systems 4. For example, ASBR 6A provides routing information to ASBR 6B that describes, generally at a high level of aggregation, an internal topology of AS 4A and/or reachability of prefixes by AS 4A. Similarly, ASBR 6A receives routing information from ASBR 6B that describes an internal topology of AS 4B and/or reachability of prefixes by AS 4B.

Routing information exchanged in BGP peering session 11 and BGP peering sessions 9 may include topology information for one or more network layer protocols. For example, ASBR 6A advertises routing information to ASBR 6B that is received from one or more interior routing protocol speakers of AS 4A executing an IGP, such as Internal BGP (iBGP). Topology information may also include administratively configured routes or other information on ASBR 6A. Network layer protocols may include Internet Protocol version 4 (IPv4), Internet Protocol version 6 (IPv6), Layer Two Virtual Private Networking (L2VPN), Layer Three VPN (L3VPN), and BGP with Traffic Engineering extensions (BGP-TE).

Autonomous system 4A includes BGP speakers that peer with one another to internally advertise routing information for prefixes reachable by ASBR 6A to other routers within AS 4A. BGP speakers of AS 4A include ASBR 6A, route reflector 17, and router 8A. Router 8A may represent, for instance, an internal router or an ASBR of AS 4A. ASBR 6A and router 8A each establish a BGP peering session 9 with which to exchange routes with route reflector 17. Route reflector 17 is a BGP speaker that re-advertises (or "reflects") routes received from other BGP speakers to enable the BGP speakers to avoid forming a full mesh of peering sessions 9. However, in instances of network system 2 that do not include route reflector 17, ASBR 6A and router 8A may peer directly in a peering session.

Autonomous system 4B also includes BGP speakers that peer with one another to internally advertise routing information for prefixes reachable by ASBR 6B to other routers within AS 4B. BGP speakers of AS 4B include ASBR 6B and router 8B. Router 8B may represent, for instance, an internal router or an ASBR of AS 4B. ASBR 6B and router 8B establish a BGP peering session 9 with which to exchange routing information.

Routing protocol advertisements issued by ASBRs 6, routers 8, and route reflector 17 may represent, for example, BGP UPDATE messages. In conventional BGP, a BGP UPDATE message associates a network layer protocol prefix with a NEXT_HOP for the prefix and a list of autonomous systems that must be traversed to reach the prefix ("AS_PATH" in BGP UPDATE messages).

In accordance with techniques described herein, routers 8A-8B include respective BGP interfaces 12A-12B (illustrated as BGP IFs 12A-12B ad collectively referred to herein as "BGP interfaces 12") that enable respective applications 16A-16B (collectively, "applications 16") to modify the operation of MP-BGP by routers 8 to effect dynamic, generalized application data distribution for the applications. BGP interface 12A, for example, includes methods and parameters that permit application 16A executing on router 8A to register a new address family identifier for MP-BGP for use by the application 16A for application data distribution. The new address family identifier is an address family identifier that is not previously associated in router 8A with an application and/or with a network layer protocol. Put another way, the new address family identifier is not pre-defined in the implementation of MP-BGP developed by the vendor of router 8A. Such an implementation may, for instance, pre-define address family identifiers for well-known network layer protocols (e.g., the network layer protocols listed above) and provide well-defined interfaces to applications executing on router 8A that seek to make use of network layer information exchanged by router 8A in accordance with those protocols. Furthermore, although the new "address family identifier" refers to an "address family" in keeping with the conventional uses of BGP (i.e., distributing network layer reachability information (e.g., routes to network layer endpoints)), application 16A may register the new address family identifier for use in distributing application data that may be more loosely related or even unrelated to network layer protocols.

Upon registering the new address family identifier, application 16A may invoke BGP interface 12A to inject application data into the MP-BGP process of router 8A, which then distributes the injected application data to BGP peers in attributes in a BGP UPDATE message that specifies the new address family identifier registered by application 16A. In addition, BGP interface 12A provides an interface with which application 16A may withdraw application data from the routing plane to indicate one or more NLRI prefixes are no longer reachable from router 8A or are otherwise invalid. As used herein, the term "application data" may refer to a route carried in a BGP UPDATE message, said route including one or more NLRI prefixes together with a set of one or more shared path attributes for the prefixes. In some cases, one or more of the path attributes may be application-specific and received via BGP interface 12A as opaque Type-Length-Value (TLV) objects for distribution along with the network layer prefixes. In this way, intermediate routers of network system 2 may accept and distribute path attributes that are not comprehensible to their respective BGP implementations. A vendor of applications 16 may elect to register any of the path attributes with the Internet Assigned Numbers Authority (IRNA).

In the illustrated example, application 16A invokes BGP interface 12A to inject application data in the MP-BGP process of router 8A, which responsively issues BGP UPDATE message 10A to route reflector 17 that includes NLRI that specifies the new address family identifier registered by application 16A. Route reflector 17 reflects BGP UPDATE message 10A as BGP UPDATE message 10B to ASBR 6A, which forwards the attributes and associated prefixes in BGP UPDATE message 10C to ASBR 6B, which forwards the attributes and associated prefixes in BGP UPDATE message 10D to router 8B. Router 8B may then deliver the application data to application 16B for processing. As indicated above, route reflector 17 and ASBRs 6 may be unable to interpret the application data included in BGP UPDATE messages 10A-10D for use in routing or other applications. Regardless, route reflector 17 and ASBRs 6 may reflect or exchange the application data which they are unable to interpret.

BGP interface 12A thus exposes MP-BGP to enable any application executing on router 8A to dynamically utilize the routing plane of network system 2 to distribute application-specific data to other routers in the network without requiring offline modification, by the vendor, to the software code that implements MP-BGP for router 8A. In addition, the techniques may be applied without requiring offline modification, by the vendor, to other BGP speakers of network system 2, including route reflect 17 and ASBRs 6. Applications 16 may each represent a vendor-supplied or a third-party application executing on respective software platforms of routers 8 that include respective BGP interfaces 12. Application 16A may represent a client and application 16B a server in a client-server model, or applications 16 may represent peers in a peer-to-peer (P2P) model, for instance. Application data exchanged by applications 16 may include router information such as operational data including available bandwidth for interfaces, CPU utilization, temperature, router identifiers, and failure information; network layer protocol information for network layer protocols; topology information such as Application-Layer Traffic Optimization (ALTO) network and cost maps; traffic engineering data; or any other data usable by applications 16 to improve the operation of network system 2 for packet delivery or provide information to operators of ASes 4.

For a vendor, the techniques may therefore enable the MP-BGP process and application development teams to improve innovation and time to market by reducing the resources and team coordination required to produce a stable application that uses a pre-defined extension to MP-BGP by decoupling, at least to some extent, development for the MP-BGP process and for the application. Similarly, third-party developers may use the techniques to develop custom applications independently of the network router vendor to improve and/or extend operations of a third-party network, for example, without having to enlist the vendor to perform offline application-specific modifications to the MP-BGP process, thus improving the scalability of the network system 2 routing plane for third-party developers. In addition, by utilizing an existing and well-documented routing protocol having a large base of knowledgeable users, to distribute application-specific data, the techniques may facilitate reliable, loop-free, and generalized data distribution throughout network system 2.

While described herein primarily with respect to MP-BGP, the techniques are extendible to other exterior and interior routing protocols such as Open Shortest Path First (OSPF) and Intermediate System-to-Intermediate System (IS-IS). For example, router 8A may provide an OSPF interface by which application 16A may modify the operation of OSPF by router 8A to flood application data injected by application 16A via the OSPF interface throughout an OSPF area of AS 4A. In addition, the techniques may be applied by network devices other than routers, such as route servers, content servers, Domain Name Service (DNS) servers, switches, and route reflectors.

Figure 2:
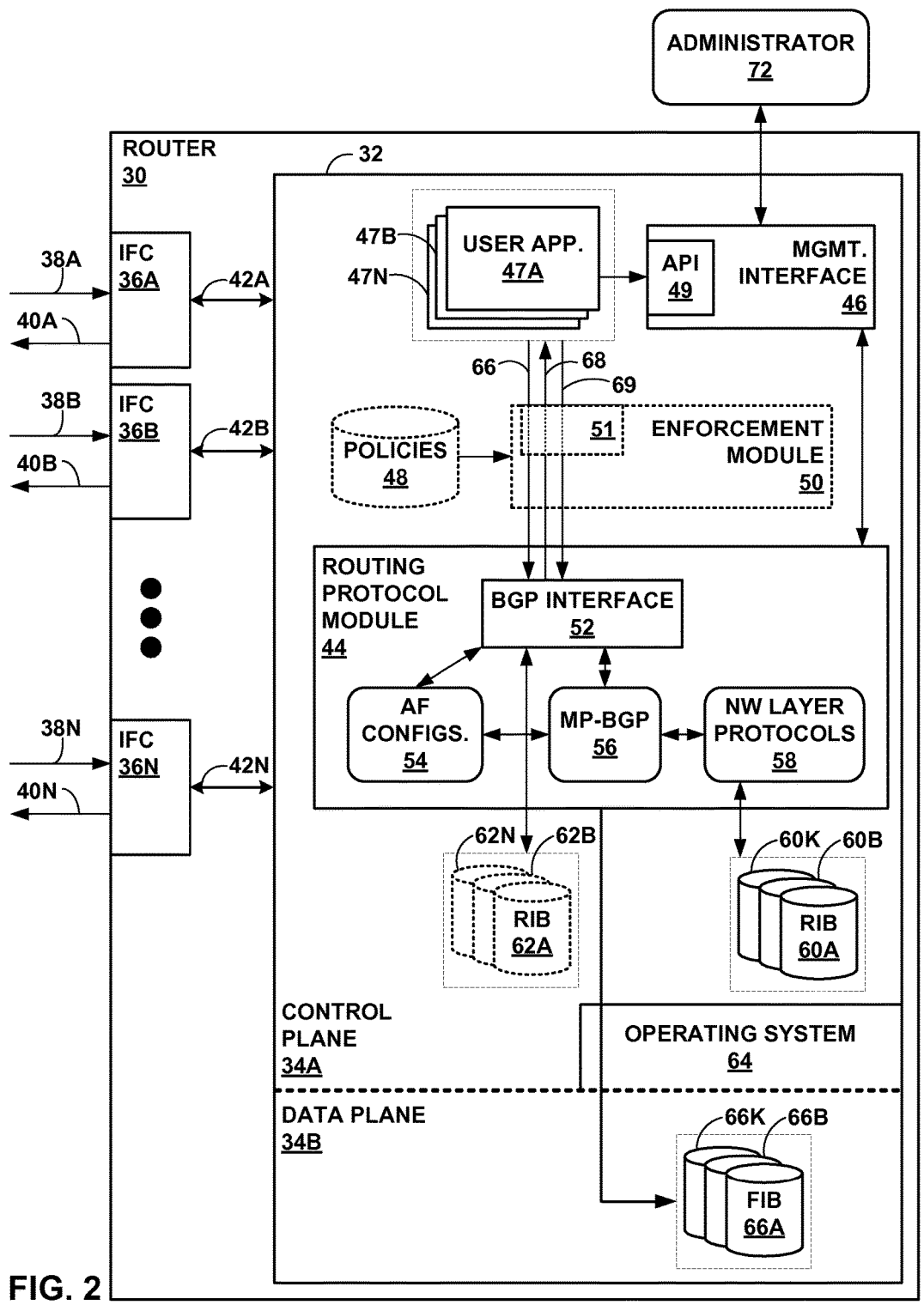
FIG. 2 is a block diagram illustrating an example of a router that includes an interface for dynamically extending a routing protocol to advertise application-specific data in routing protocol advertisements in accordance with techniques of the disclosure.

FIG. 2 is a block diagram illustrating an example of a router that includes an interface for dynamically extending a routing protocol to advertise application-specific data in routing protocol advertisements in accordance with techniques of the disclosure. For purposes of illustration, example router 30 may be described in the context of network system 2 and may represent any of routers 8 of FIG. 1.

Router 30 includes a control unit 32 and interface cards 36A-36N ("IFCs 36") coupled to control unit 32 via internal links 42A-42N. Control unit 32 may comprise one or more processors (not shown in FIG. 2) that execute software instructions, such as those used to define one or more software or computer programs, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 32 is divided into two logical or physical "planes" to include a first control or routing plane 34A ("control plane 34A") and a second data or forwarding plane 34B ("data plane 34B"). That is, control unit 32 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 34A represents hardware or a combination of hardware and software of control unit 32 that define control plane functionality of router 30. Control plane 34A manages and controls the behavior of router 30, including the behavior of data plane 34B. Operating system 64 of control plane 34A provides a run-time environment for multiple different processes. Operating system 64 may represent, for example, a UNIX operating system derivative such as Linux or Berkeley Software Distribution (BSD). Operating system 64 offers libraries and drivers by which processes may interact with data plane 34B, for example, or other hardware of router 30, including a file-system and main memory for router 30. Libraries and drivers of operating system 64 may include Application Programming Interfaces (APIs) that provide standard interfaces for developers to invoke the functionality of operating system 64 and router 30 exposed by the libraries and drivers.

Processes executed by control plane 34A include vendor-supplied processes that implement routing functionality and provide interfaces for managing router 30. Here, "vendor" refers to a manufacturer of router 30 and/or operating system 64. Router 30 and/or operating system 64 may be distributed in conjunction with vendor-supplied processes to provide "turn-key" routing functionality with the router 30 hardware.

In the illustrated example, vendor-supplied routing protocol module 44 ("RP module 44") represents a routing protocol process that executes MP-BGP 56 by which routing information stored to one or more routing information bases 60A-60K (collectively, "RIBs 60") for respective address families may be determined. Routing information bases 60 stored to a computer-readable storage medium of control unit 32 (not shown in FIG. 2) may include information defining a topology of a network, such as network system 2 of FIG. 1. Each of RIBs 60 may be associated with a different one of network layer protocols 58 (illustrated as "NW layer protocols 58"). In such instances, because each of network layer protocols 58 is associated with a different address family (identified, e.g., by an AFI/SAFI combination), each of RIBs 60 is likewise associated with a different address family recognized by MP-BGP 56, a BGP implementation included in vendor supplied RP module 44. For example, RIB 60A may be associated with IPv4 (and the address family identifier thereof), RIB 60B may be associated with IPv6 (and the address family identifier thereof), RIB 60C may be associated with L3VPN (and the address family identifier thereof), and so on. RIBs 60 thus define a set of predefined databases each associated with a different one of a set of predefined address family identifiers for respective network layer protocols 58. In this context, "predefined" refers to a static implementation of RIBs 60 and a static association of address family identifiers with network layer protocols/respective RIBs 60 within the version of RP module 44 developed by the vendor of router 30 and/or operating system 64. In other words, RIBs 60 and the association between network layer protocols 58 respective address family identifiers, and respective RIBs 60 is "hard-coded" within the version of RP module 44 distributed by the vendor. While described herein as constituting separate data structures, RIBs 60 may be implemented by control plane 34A as any one of a number of suitable data structures, such as a single table with an address family identifier field specifying the address family identifier for each table row, a set of tables or databases for each of RIBs 60, linked lists, trees, tries, and so on. Because RP module 44 uses MP-BGP 56 for routing information distribution, one or more of RIBs 60 may each include a set of one or more NLRI for the corresponding address family.

Routing protocol module 44 resolves the topology defined by respective routing information in RIBs 60 to select and/or determine one or more routes through the network for network layer protocols 58. Routing protocol module 44 may then update data plane 34B with these routes, where data plane 34B maintains a representation of these routes as respective forwarding information bases 66A-66K (collectively, "FIBs 66"). Each of FIBs 66 is associated with one or RIBs 60 that includes routing information for one of network layer protocols 58. Typically, routing protocol module 44 generates each of FIBs 66 in the form of a radix or other lookup tree to map packet information (e.g., header information having destination information and/or a label stack) to next hops and ultimately to interface ports of IFCs 36.

Forwarding or data plane 34B represents hardware or a combination of hardware and software of control unit 32 that forwards network traffic in accordance with FIBs 66. Data plane 34B may include one or more forwarding units that each includes, for example, one or more packet forwarding engines ("PFEs") each coupled to one or more interface cards. A forwarding unit may each represent, for example, a dense port concentrator (DPC), modular port concentrator (MPC), flexible physical interface card (PIC) concentrator (FPC), or another line card, for instance, that is insertable within a router 30 chassis or combination of chassis.

In accordance with techniques of this disclosure, RP module 44 executes BGP interface 52 by which user applications 47A-47N (collectively, "user applications 47" and illustrated as "user app. 47A-47N") modify the operation of MP-BGP 56 to facilitate generalized distribution of application-specific data. BGP interface 52 may represent any of BGP interfaces 12 of FIG. 1 and may include a user-level library invocable by user applications 47 for directing RP module 44 to register new address families and to exchange, with other routers using MP-BGP 56, application data using the new address families on behalf of user applications 47. BGP interface 52 may use a sockets library, shared memory, files, message passing such as Common Object Request Broker Architecture (CORBA) techniques, message queuing, or other inter-process communication (IPC) mechanism for communication between user applications 47 and RP module 44. In some instances, aspects of BGP interface 52 may be implemented as a kernel-level library of operating system 64. A manufacturer of RP module 44 may provide an API description for BGP interface 52 to enable third-party developers or other manufacturer software development teams to develop user applications 47 that programmatically manipulate RP module 44 and dynamically make use of BGP extensibility techniques described herein.

Each of user applications 47 is a user-level process executing on the software environment provided by operating system 64 of control plane 34A. Any of user applications 47 may represent an application developed by a third party, such as a vendor customer or partner, an Original Equipment Manufacturer (OEM), or a research institution, that manipulates vendor-supplied components of router 30, including operating system 64, RP module 44, and/or management interface 46 to facilitate third party purposes such as network operations and management, processing data into business information, running network experiments to further research goals, among others. The third party developers may use a vendor-supplied software development kit (SDK) that provides the tools, APIs, and libraries to develop user applications 47 that use BGP interface 52. The vendor supplied SDK may, for example, provide C/C++ APIs. Any of user applications 47 may alternatively represent an application developed by the vendor but nevertheless making use of BGP interface 52. For the vendor, this may enable the RP module 44 and user applications 47 development teams to decouple, at least to some extent, their respective development processes and improve innovation and time to market by reducing the resources and team coordination required to produce a stable application that exchanges application data with other routers using MP-BGP 56.

BGP interface 52 provides user applications 47 with a registration interface (hereinafter, "register method") for registering a new address family by specifying a corresponding address family identifier. An unregistration interface (hereinafter, "unregister method") of BGP interface 52 allows user applications 47 to remove a previously registered address family by specifying a corresponding address family identifier. As noted above, an address family identifier may represent an AFI/SAFI combination. In the illustrated example, when invoked by user application 47A with a register method invocation message 67 specifying an address family identifier, BGP interface 52 dynamically creates routing information base (RIB) 62A to store application data associated with the address family identified by the address family identifier. BGP interface 52 additionally configures the new address family identifier in address family configuration data 54 (illustrated as "AF config. 54"). User application 47A may use one of the IPC mechanisms described above to send register method invocation message 67.

Dynamically created routing information bases 62A-62N (collectively, "RIBs 62") stored to a computer-readable storage medium of control unit 32 (not shown in FIG. 2) may include application data associated with respective user applications 47. Each of RIBs 62 is not predefined and is instead dynamically created by BGP interface 52 of RP module 44 responsive to invocation of the register method. Accordingly, RIBs 62 are illustrated as dashed lines to indicate that their instantiation is contingent upon the actions of user applications 47 to invoke the register method of BGP interface 52. While described herein as constituting separate data structures, RIBs 62 may be implemented by control plane 34A as any one of a number of suitable data structures, such as a single table with an address family identifier field specifying the address family identifier for each table row, a set of tables or databases for each of RIBs 62, linked lists, trees, tries, and so on. Control unit 32 may store RIBs 62 using one or more data structures substantially similar to those used for storing RIBs 60.

Application data stored to RIBs 62 may, but does not necessarily, include routing information for network layer protocols such as IPv4, IPv6, and L3VPN. Rather, application data may include any data that user applications 47 distribute or obtain by operation of RP module 44 executing MP-BGP 56 to exchange BGP UPDATE messages that include attributes carrying the application data.

Address family configuration data 54 includes a data structure to associate address family identifiers with respective RIBs 62. As described in further detail below, address family configuration data 54 may additionally associate each of the address family identifiers with a callback function or other reference, provided by the one of user applications 47 that registers the address family identifier, that RP module 44 invokes upon receiving application data associated with the address family in a BGP UPDATE message.

The register method of BGP interface 52 may include an optional callback parameter by which user applications 47 may register a callback function, a reference to a shared memory location or other IPC object, or some other reference that manipulates the operation of RP module 44 upon receiving BGP UPDATE messages that specify an address family identifier registered with the register method (as used herein, a "callback"). When one of user applications 47 invokes the register method including the optional callback parameter, BGP interface 52 associates the address family identifier provided in the register method with the value of the callback parameter in address family configuration data 54. When RP module 44 receives a BGP UPDATE message specifying an address family identifier, RP module 44 may extract the application data (e.g., the NLRI prefixes and associated path attributes) and look up the specified address family identifier in address family configuration data 54. If the address family identifier is associated with a callback parameter value, RP module 44 provides the extracted application data to one of user applications 47 using the value of the callback parameter. In the illustrated example, BGP interface 52 invokes a callback function to send callback message 68 including extracted application data to user application 47A.

The register method of BGP interface 52 may include an additional optional callback parameter by which user application 47 may register a callback functional for withdrawal advertisements received. As with the advertisement callback described above, when one of user applications 47 invokes the register method including the additional optional callback parameters for withdrawal advertisements, BGP interface 52 associates the address family identifier provided in the register method with the value of the withdrawal callback parameter in address family configuration data 54. When RP module 44 receives a BGP UPDATE message specifying an address family identifier, RP module 44 may extract withdrawn routes (e.g., withdrawn NLRI prefixes) and look up the specified address family identifier in address family configuration data 54. If the address family identifier is associated with a withdraw callback parameter value, RP module 44 provides the extracted withdrawn routes to one of user applications 47 using the value of the withdraw callback parameter.

BGP interface 52 additionally includes a distribute interface (hereinafter, "distribute method") by which user applications 47 may specify an address family identifier registered in address family configuration data 54 and direct RP module 44 to encapsulate the application data to send to other network devices in BGP UPDATE messages that specify the address family identifier. In the illustrated example, user application 47A sends distribute method invocation message 69 including application data and an address family identifier to invoke the distribute method of BGP interface 52. If the address family identifier is registered, RP module 44 sends the application data to BGP peer routers of router 30 that have advertised a capability to handle the address family identifier in BGP UPDATE messages. BGP interface 52 additionally includes a withdraw interface (hereinafter, "withdraw method") by which user applications 47 may specify an address family identifier registered in address family configuration data 54 and direct RP module 44 to encapsulate withdrawn routes to send to other network devices in BGP UPDATE messages that specify the address family identifier. In this way, multiple different user applications 47 may invoke BGP interface 52 of RP module 44 to distribute and withdraw application data to/from peer routers in the network using BGP. In some instances, the distribute method and withdraw methods receive application data as a struct or class (or reference thereto).

BGP interface 52 may store application data for an address family, received from user applications 47 and from BGP peer routers in BGP UPDATE messages, to the associated one of RIBs 62. BGP interface 52 may store the application data in the associated one of RIBs 62. Advertised prefixes include a string of bytes and a prefix length that may be opaque to RP module 44. In addition, some path attributes may be opaque to RP module 44 and BGP. For instance, some path attributes associated with advertised NLRI may not include routing information comprehensible to network layer protocols 58 and instead be comprehensible and thus usable only by one or more user applications 47 that inject/extract the application data. Path attributes may be new path attributes introduced by user applications 47 and may conform to a well-defined type-length-value (TLV) object. Path attributes may be encoded according to BGP encoding rules for path attributes to allow for propagation of unrecognized path attributes.

RP module 44 may perform a capability advertisement exchange to determine whether a peer BGP speaker for router 30 supports an address family registered according to the above-described techniques. Before distributing application data for a registered address family to a peer BGP speaker, RP module 44 may in some cases require receipt of a BGP Capability Advertisement issued by the peer BGP speaker and having a Capabilities Optional Parameter having a value set to the address family identifier. In some examples, this Capability Value field separately specifies the AFI and SAFI for the registered address family. Upon receiving assurances in the form of a suitable BGP Capability Advertisement, RP module 44 may then replicate, in whole or in part, the associated one of RIBs 62 for the address family to the peer BGP speaker using BGP. RP module 44 may likewise issue a BGP Capability Advertisement specifying an address family identifier to indicate to peer BGP speakers that router 30 supports the corresponding address family. The address family identifier may be dynamically announced without needing to terminate existing BGP sessions.

In general, RP module 44 executing MP-BGP 56 does not install routes to FIBs 66 for unrecognized address families. However, in accordance with the techniques described herein, user applications 47 may obtain application data (e.g., NLRI prefixes and associated path attributes) using BGP interface 52. One or more of user applications 47 may include a data plane feature that modifies forwarding information for forwarding components of router 30. Thus, in some instances, one or more of user applications 47 may directly install forwarding information to any of FIBs 66. In some instances, however, one or more of user applications 47 may install a route to one of RIBs 60. RP module 44, in turn, processes RIBs 60 according to normal route processing (such as best route selection) and may select and install a route from one of user applications 47 to FIBs 66. However, in such instances, the one of user applications 47 that installed the route retains ownership of the route and may withdraw it from the one of RIB 60 to which the route was installed.

Management interface 46 (illustrated as "mgmt. interface 46") is a process executing on control plane 34B that provides an interface by which administrator 72, a network operator or network management system for instance, may modify a configuration of router 30. Management interface 46 may present a Command Line Interface (CLI) and/or a graphical user interface (GUI) by which an administrator or other management entity may modify the configuration of router 30 using text-based commands and/or graphical interactions, respectively. In addition, or in the alterative, management interface 46 may present an agent that receives Simple Network Management Protocol (SNMP) or Netconf commands from a management entity to set and retrieve configuration and management information for router 30. Management interface 46, in the illustrated example, includes management API 49 (illustrated as "API 49") by which user applications 47 may dynamically register display functions and inject functions to enable administrator 72 to receive well-formatted application data and inject application data into RP module 44 for one or more address families, respectively.

For example, user application 47A may invoke management API 49 to modify a show command to receive an address family identifier parameter to direct management interface 46 to show application data (e.g., NRLI and associated path attributes) for the corresponding address family. In addition, user application 47A may invoke management API 49 to configure the formatting for application data displayed in response to the show command. The following CLI interactions illustrate a modified show command for management interface 46 that formats path attributes for address families to provide readable application data to administrator 72.

| user@host> show ip bgp 142/1 all | | | | |
|---|---|---|---|---|
| Network | Next Hop | Temp | CPU | Router-ID |
| *>197.1.1.0/24 | 194.22.15.1 | 146 | 12 | 197.1.1.1 |
| *>197.1.2.0/24 | 194.22.15.2 | 165 | 32 | 197.1.2.1 |

| user@host> show ip bgp.l2.vpn 142/1 all | | | | |
|---|---|---|---|---|
| Network | Next Hop | Temp | CPU | Router-ID |
| *> 192.168.24.1:1:4:1/96 | 194.22.15.1 | 146 | 12 | 197.1.1.1 |

The modified show command receives AFI/SAFI 142/1 as an address family identifier and returns three path attributes, temperature ("Temp"), CPU utilization ("CPU"), and router identifier ("Router-ID"), associated within NLRI for the corresponding address family. The first entry denotes the prefix/length for the address families and next hop for the NLRI as per a conventional show command. The prefix is in an application-specific format. The remainder of the show command entry results illustrate the modifications made in accordance with the techniques herein described to format the values for the three attributes in human-readable form. In the absence of formatting, in some instances, the modified show command may present a dump (e.g., a hexadecimal or "hex" dump) of the attribute values to administrator 72. In some instances, the address family identifier may be mapped to a string. For example, with reference to the above example, AFI/SAFI 142/1 may be mapped to "cpu-temperatures" such that administrator may invoke the show command using the string rather than the address family identifier.

In some examples, BGP interface 52 presents the display functions that are then invokable by management interface 46. In such examples, BGP interface 52 cooperates with management interface 46 to present well-formatted application data to administrator 72. In some instances, the display functions and inject functions of management API 49 include callback registration parameters that enable applications 47 to exchange application data with management interface 46. As a result, the administrator 72 may seamlessly configure and administer user applications 47 in a manner similar to that of vendor-supplied processes of router 30.

The following application programming interface provides example prototype functions of the above-described interfaces of BGP interface 52:

```
#define PREFIX_MAX_NR_BYTES 16
typedef enum {
   STATUS_OK,
   STATUS_ERROR /* List of specific error codes here */
} status_t;
typedef struct {
   /* A representation of an IPv4 or IPv6 address. */
} ip_address_t;
typedef uint8_t afi_t;
typedef uint8_t safi_t;
typedef struct {
   afi_t afi;
   safi_t safi;
} afisafi_t;
typedef struct {
   uint8_t prefix[PREFIX_MAX_NR_BYTES];
   uint8_t length; /* Prefix length in bits */
} prefix_t;
#define PATH_ATTRIBUTE_FLAG_OPTIONAL 0x80;
#define PATH_ATTRIBUTE_TRANSITIVE 0x40;
#define PATH_ATTRIBUTE_FLAG_PARTIAL 0x20;
#define    PATH_ATTRIBUTE_FLAG_EXTENDED_
LENGTH 0x10;
/* Etcetera */
#define PATH_ATTRIBUTE_TYPE_ORIGIN 1
#define PATH_ATTRIBUTE_TYPE_AS_PATH 2
#define PATH_ATTRIBUTE_TYPE_NEXT_HOP 3
#define PATH_ATTRIBUTE_TYPE_MED 4
/* Etcetera */
*/
Generic structure for a path attribute.
*/
typedef struct {
   uint8_t flags;
   uint8_t type;
   uint16_t length;
   uint8_t *value;
} attribute_t;
/*
 * The prototype for the callback function which is called
when
 * BGP learns a new route from a peer.
 */
typedef void (*route_advertisement_received_cb_t)(
   afisafi_t afisafi, /* The address family of the route
*/
   prefix_t prefix, /* The prefix of the route */
   ip_address_t peer, /* The peer from which the route
advertisement was received */
   attribute_t attributes[ ] /* The path attributes of the route
*/
   );
/*
 * The prototype for the callback function which is called
when
 * BGP unlearns a route (i.e. when a peer withdraws a
route).
 */
typedef void (*route_withdrawl_received_cb_t)(
   afisafi_t afisafi, /* The address family of the route
*/
   prefix_t prefix, /* The prefix of the route */
   ip_address_t peer); /* The peer which the route withdrawl
was received */
/*
 * The prototype for the callback function which is called
when
 * a prefix (of an unregistered address family) is to be
 * formatted in a human-readable format. If NULL is
returned BGP
 * may hex-dump the prefix.
 */
typedef char* (*format_prefix_cb_t)(
   afisafi_t afisafi,
   prefix_t prefix);
/*
 * The prototype for the callback function which is called
when
 * a path attribute (of a type unknown to BGP) needs to be
 * formatted in a human readable format. If NULL is
returned BGP
 * will hex-dump the path attribute.
 */
typedef char* (*format_attribute_cb_t) (
   attribute_t attribute);
status_t
register_address_family(
   afisafi_t afisafi,
   route_advertisement_received_cb_t,
   route_advertisement_received_cb,
   route_withdrawl_received_cb_t   route_withdrawl_re-
ceived_cb,
   format_prefix_cb_t format_prefix_cb,
   format_attribute_cb_t format_attribute_cb);
status_t
unregister_address_family(
   afisafi_t afisafi);
status_t
advertise_route(
   afisafi_t afisafi,
   prefix_t prefix,
   attribute_t attributes[ ]);
status_t
withdraw_route(
   afisafi_t afisafi,
   prefix_t prefix);
/*
 * Example helper functions for encoding/decoding the
MED path
 * attribute.
 */
status_t
encode_path_attribute_med(
   attribute_t *attribute,
   uint32_t med
   );
status_t
decode_path_attribute_med(
   const attribute_t *attribute,
   uint32_t *med
   );
```

In the above example API, the advertise_route function is an example of the distribute method of BGP interface 52; the withdraw_route function is an example of the withdraw method; the register_address_family function is an example of the register method; the unregister_address_family function is an example of the unregister method.

BGP is a critical protocol whose reliable operation is essential to the reliable operation of network systems. Because the techniques described herein may increase BGP traffic in the network system by effectively opening the routing plane to user applications 47, control unit 32 may in some instances apply policies 58 directed to limiting, shaping, or otherwise managing the BGP-related activities of user applications 47. Enforcement module 50 optionally executed by control plane 32A intermediates communications, received with interface 51, between user applications 47 and BGP interface 52 to apply policies 48 and thus provide a policy framework that controls whether and to what extent any given one of user applications 47 may interact via BGP interface 52 with the operation of BGP. Policies 48 include a set of one or more policies that each defines a condition and corresponding action for enforcement by, for instance, enforcement module 50. As examples, policies 48 may specify user application 47B may not inject more than 100 NLRI into any of RIBs 62, may specify none of user applications 47 may introduce NLRI having size greater than 1 KB, and/or may specify user applications 47A, 47B may not introduce NLRI (such user application may not be verified by the vendor, for instance). In this way, policies 48 control the mediate the interaction of user applications 47 and RP module 44. Application of policies 48 may therefore reduce a probability that third-party user applications 47 may negatively affect the operation of BGP and, thus, the operation of the network system in which router 30 participates.

Enforcement module 50 and policies 48 are illustrated using dashed lines to indicate their presence is optional. In some instances, RP module 44 applies policies 48 directly, rather than by intermediating enforcement module 50. Administrator 72 may in some instances use management interface 46 to add, modify, and delete any of policies 48.

Figure 3:
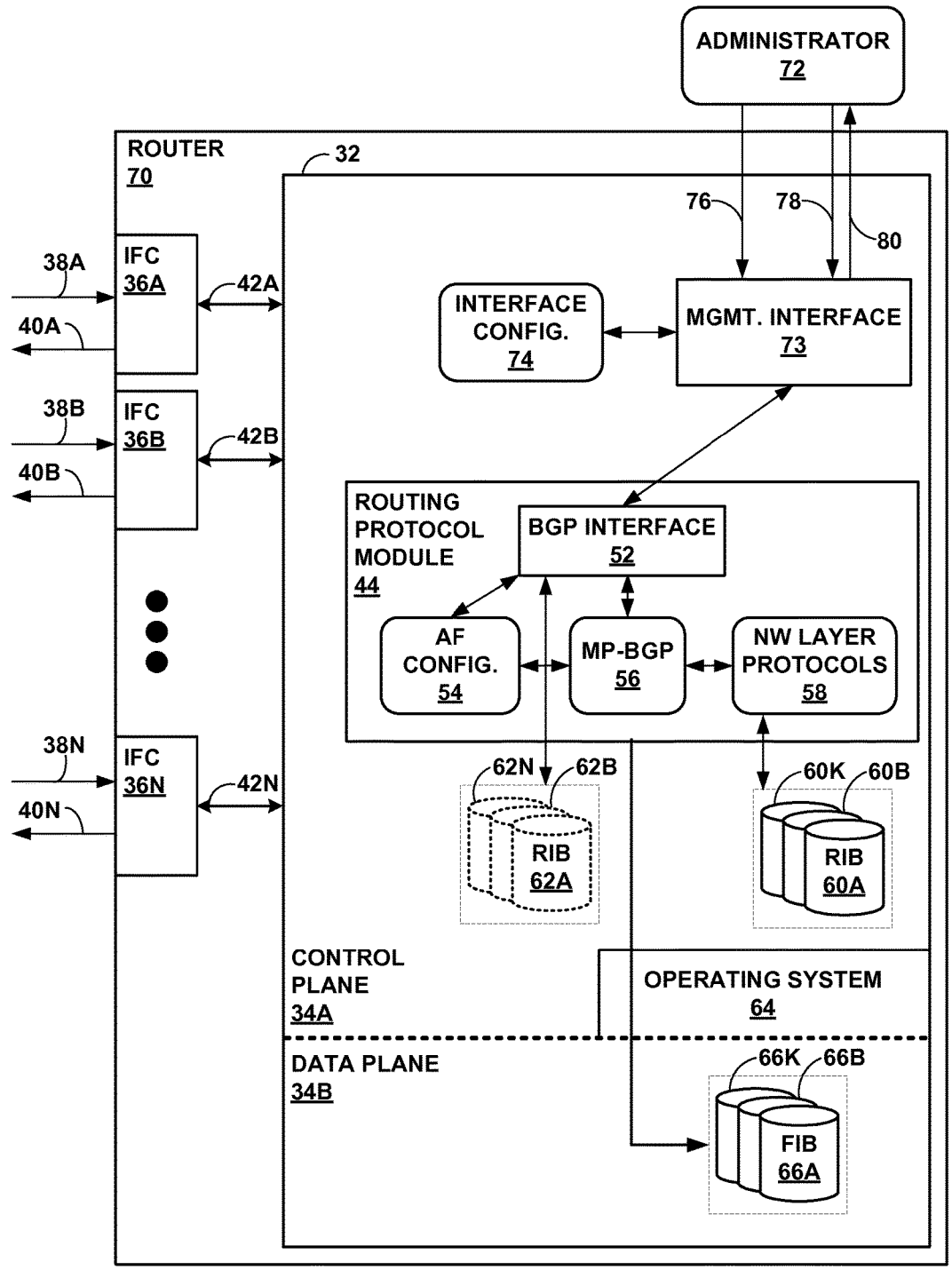
FIG. 3 is a block diagram illustrating an example of a router that includes an interface for dynamically extending a routing protocol to advertise application-specific data in routing protocol advertisements according to techniques described herein.

FIG. 3 is a block diagram illustrating an example of a router that includes an interface for dynamically extending a routing protocol to advertise application-specific data in routing protocol advertisements according to techniques described herein. For purposes of illustration, example router 70 may be described in the context of network system 2 and may represent any of routers 8, router reflector 17, and ASBRs 6 of FIG. 1.

Router 70 shares a number of features in common with example router 30 of FIG. 2. For example, router 70 includes RP module 44 having a BGP interface 52. Entities, in this case administrator 72 via management interface 73, may extend the operation of MP-BGP 56 by registering one or more address families using BGP interface 52. That is, management interface 73 presents one or more commands by which administrator 72 may direct RP module 44 to support a particular address family that is not predefined in a vendor-supplied implementation. Thus, while RP module 44 may be unable to process application data for a dynamically-registered address family to, for instance, identify shortest paths through the network, RP module 44 may nevertheless transparently reflect/forward the application data to other BGP peers in the network. In this way, routers that do not execute a user application (e.g., one of user applications 47 of FIG. 2) may nevertheless cooperate to use BGP to distribute generalized application data throughout the network.

Management API 75 provides a registration interface (hereinafter, the "register command") for registering a new address family by specifying a corresponding address family identifier. In some examples, the register command receives an AFI/SAFI and application data formatting information in an optional application data formatting information parameter. Formatting information may include a formatting string (e.g., "Value A:%3.1f\t Value B:%d"), a code snippet, a stylesheet, a set of attribute type-formatting string mappings, or other formatting information for rendering application data in a form comprehensible to administrator 72. Management interface 73 stores formatting information to interface configuration data 74 (illustrated as "interface config. 74") in association with the corresponding address family identifier.

In the illustrated example, administrator 72 issues register command 76 to management interface 73 to register a new address family identifier. Management interface 73, in turn, invokes the register method of BGP interface 52 to add the address family identifier to address family configuration data 54 and to create a corresponding one of RIBs 62 for the address family identifier. RP module 44 may then reflect and/or forward BGP UPDATE messages specifying the address family identifier to transport application data included therein.

Administrator 72 may issue show command 78 specifying the address family identifier. Management interface 73 responds by obtaining application data (e.g., in NLRI stored to the corresponding one of RIBs 62) for the address family identifier using BGP interface 52, formatting the application data according to forwarding information associated with the address family identifier in interface configuration data 74, and returning the formatted application to administrator 72 in response message 80.

Using management interface 73, administrator 72 may configure address families for reflection/exchange that are not hard-coded in a static implementation of RP module 44 by configuring, for example, numerical AFI/SAFI values. Such address families, once configured, may be negotiated by router 70 with other routers using, for example, the Multiprotocol Extensions Capability in a BGP OPEN message or by using dynamic capability negotiation. The address family may be dynamically announced without needing to terminate existing BGP sessions. In addition, as described above, RP module 44 stores application data for a newly configured address family to a dynamically created one or RIBs 62.

In addition, administrator 72 may invoke management interface 73 to specify a behavior of RP module 44 with respect to next hop attributes received in BGP UPDATE messages having NLRI that specify a newly configured address family. For example, administrator 72 may invoke management interface 73 to direct RP module 44 to avoid attempting to resolve a next hop for unknown address family identifiers (e.g., AFI/SAFI combinations). That is, RP module 44 considers all such next hops to be reachable. As another example, administrator 72 may invoke management interface 73 to direct RP module 44 to resolve the next hop according to a known address family, such as IPv4 or IPv6. In such instances, RP module 44 may be directed to use one of RIBs 60 to interpret next hops for unknown address families.

Different combinations of features of router 30 of FIG. 2 and router 70 of FIG. 3 may be included in various example routers that apply techniques described in this disclosure. For example, features of management interface 46 and management interface 73 may be combined in a single router.

Figure 4:
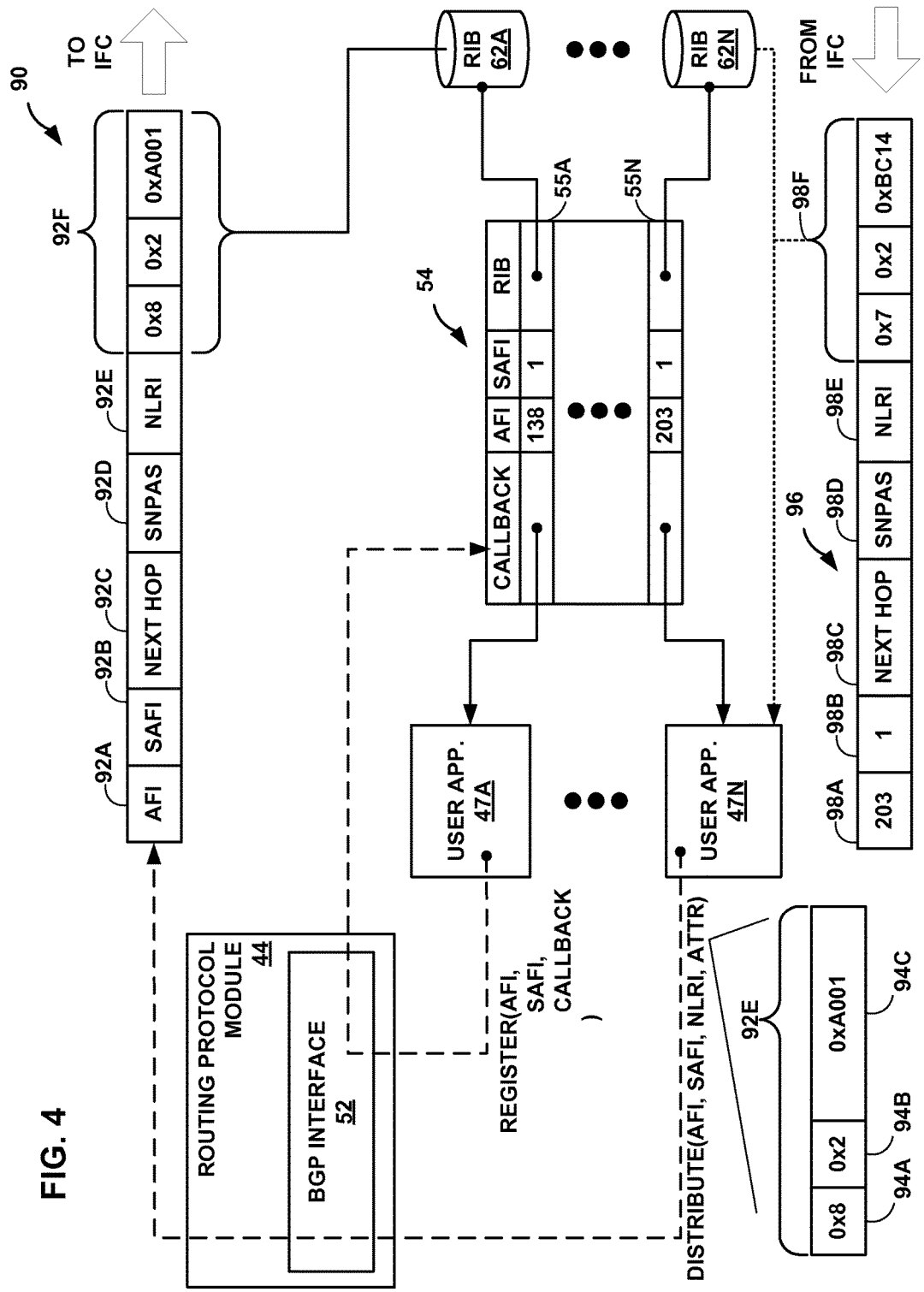
FIG. 4 is a block diagram illustrating example router components for dynamically registering a new address family for a routing protocol and using the new address family to distribute and receive application data with a router in accordance with techniques of the disclosure.

FIG. 4 is a block diagram illustrating example router components for dynamically registering a new address family for a routing protocol and using the new address family to distribute and receive application data with a router in accordance with techniques of the disclosure. The example router components may be described in the context of router 30 of FIG. 2.

User applications 47 execute on a control unit of a router on which routing protocol module 44 also executes. User application 47A invokes a register method exposed by BGP interface 52 and supplies an AFI, a SAFI, and a callback parameter value. The combination of the AFI and SAFI define, in this example, a distinct address family for MP-BGP. The callback parameter value identifies a mechanism by which RP module 44 may provide application data to user application 47A.

BGP interface 52 responsively executes the register method invoked by user application 47A to register the address family and callback by dynamically creating RIB 62A and inserting table entry 55A into address family configuration data 54. In the illustrated example, address family configuration data 54 is a table that includes table entries 55A-55N each having values for CALLBACK, AFI, SAFI, and RIB fields. For each of table entries 55, the CALLBACK field stores a callback value, the AFI and SAFI fields define an address family, and the RIB field includes a reference to one of RIBs 62.

User application 47N also executing on the router control unit invokes a distribute method exposed by BGP interface 52 and supplies an AFI, a SAFI, and application data in the form of NLRI 92E and TLV object 92F. TLV object 92F includes type value 94A, length value 94B, and value 94C. RP module 44 may verify the address family defined by the AFI/SAFI values is registered in one of table entries 55 of address family configuration data 54. RP module 44 adds NLRI 92E and TLV object 92F to RIB 62A associated with table entry 55A. RP module 44 generates Multiprotocol Reachable NLRI 90 using NLRI 92E and TLV object 92F supplied to BGP interface 52. Multiprotocol Reachable NLRI 90 includes AFI 92A, SAFI 92B, NEXT HOP 92C, Subnetwork Points of Attachment (SNPAs) 92D, NLRI 92E, and TLV object 92F. Having generated Multiprotocol Reachable NLRI attribute 90, RP module 44 includes Multiprotocol Reachable NLRI attribute 90 in a BGP UPDATE message for issuance by one of the router IFCs to a peer BGP router.

RP module 44 executing BGP additionally receives, by an IFC of the router, a BGP UPDATE message that includes Multiprotocol Reachable NLRI 96. RP module 44 uses the values of AFI 98A and SAFI 98B as lookup values to table entries 55 of address family configuration data 54. In this example, the values of AFI 98A and SAFI 98B key to table entry 55N defining a callback to user application 47N and including a reference to RIB 62N. RP module 44 extracts TLV object 98F from Multiprotocol Reachable NLRI 96 and supplies NLRI 98E and TLV object 98F (or a representation thereof) to user application 47N by invoking the callback defined in table entry 55N. In addition, RP module 44 adds NLRI 98E and TLV object 98F to RIB 62N.

In examples instances of the described techniques that utilize different routing protocols to carry the application data, TLV objects 98E may be carried within a link state message that conforms to a format for a class of OSPF LSAs referred to as "Opaque LSAs." Additional details regarding Opaque LSAs are found in "The OSPF Opaque LSA Option," RFC 5250, July 2008, which is incorporated by reference herein. Further details of the format of OSPF link state messages can be found in "OSPF Version 2," RFC 2328, Internet Engineering Task Force (IETF), April 1998, incorporated herein by reference. In some examples, a router may generate an extended IS-IS Link State Protocol Data Unit that incorporates TLV object 98E to exchange application-specific data in accordance with techniques described herein. IS-IS is described in "OSI IS-IS Intra-domain Routing Protocol," RFC 1142, Network Working Group of IETF, February 1990, the entire contents of which is incorporated herein by reference.

Figure 5:
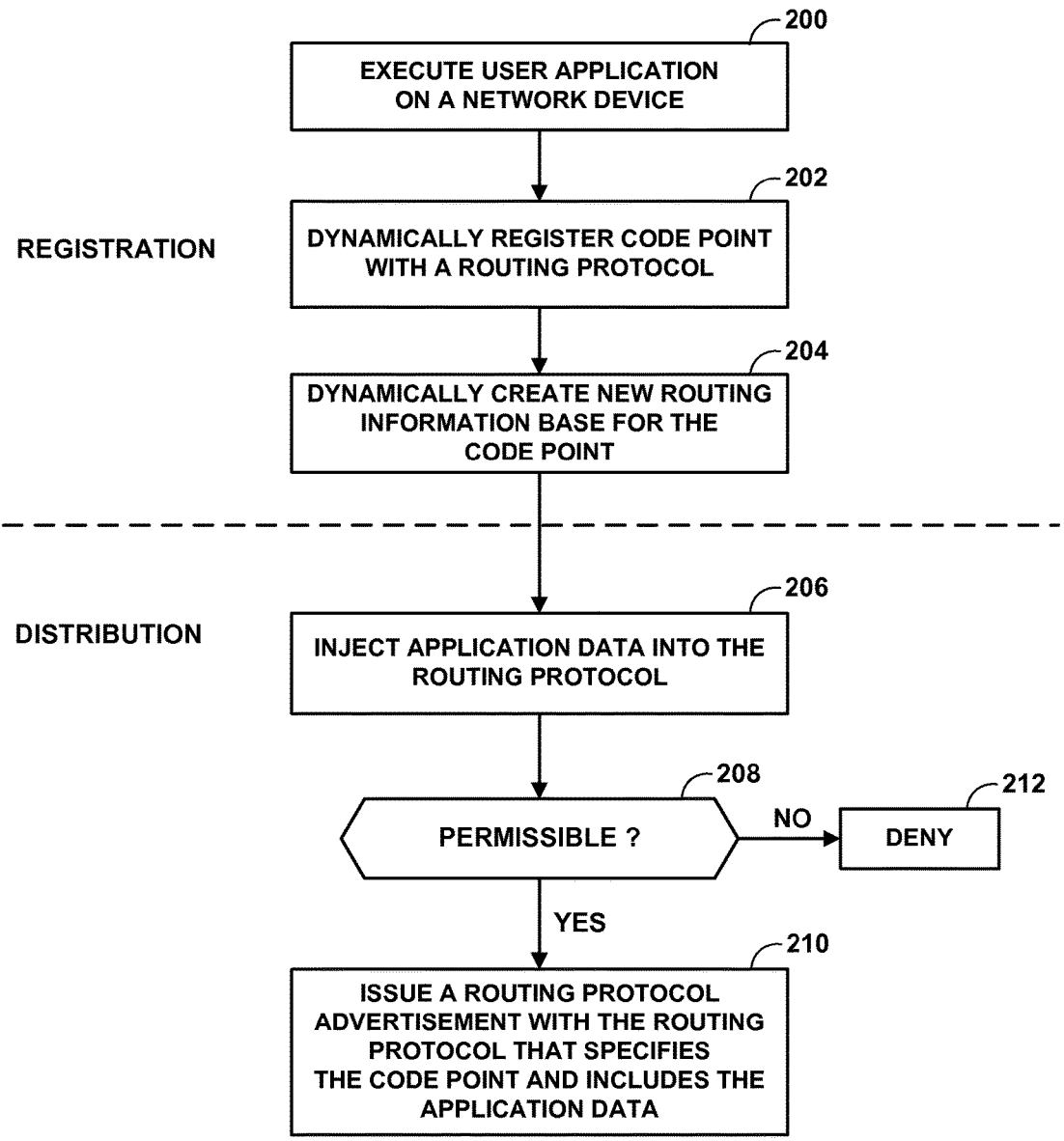
FIG. 5 is a block diagram illustrating an example mode of operation for a network device to dynamically register a new address family for a routing protocol and use the new address family to distribute application data according to techniques described herein.

FIG. 5 is a block diagram illustrating an example mode of operation for a network device to dynamically register a new address family for a routing protocol and use the new address family to distribute application data according to techniques described herein. The mode of operation is described with respect to router 30 of FIG. 2.

User application 47A may represent a third-party or vendor-supplied user process executing on control plane 34A components of router 30 (200). During a registration phase, user application 47A invokes a BGP interface 52 of an RP module 44 to dynamically register an address family identifier with a routing protocol, such as BGP (202). BGP interface 52, in response, dynamically creates a new routing information base (e.g., RIB 62A) to store, for instance, application data received in routing protocol advertisements that specify the address family identifier (204).

The address family identifier being registered, user application 47A may then inject application data into the routing protocol by invoking BGP interface 52 (206). Enforcement module 50, in this mode of operation, applies policies 48 to determine whether the injection is permissible (208). If policies 48 prevent injection of the application into the routing protocol (NO branch of 208), enforcement module denies the injection request (212). Otherwise, RP module 44 encapsulates the application data into a routing protocol advertisement that specifies the address family identifier and issues the routing protocol advertisement to a routing protocol peer (210).

Figure 6:
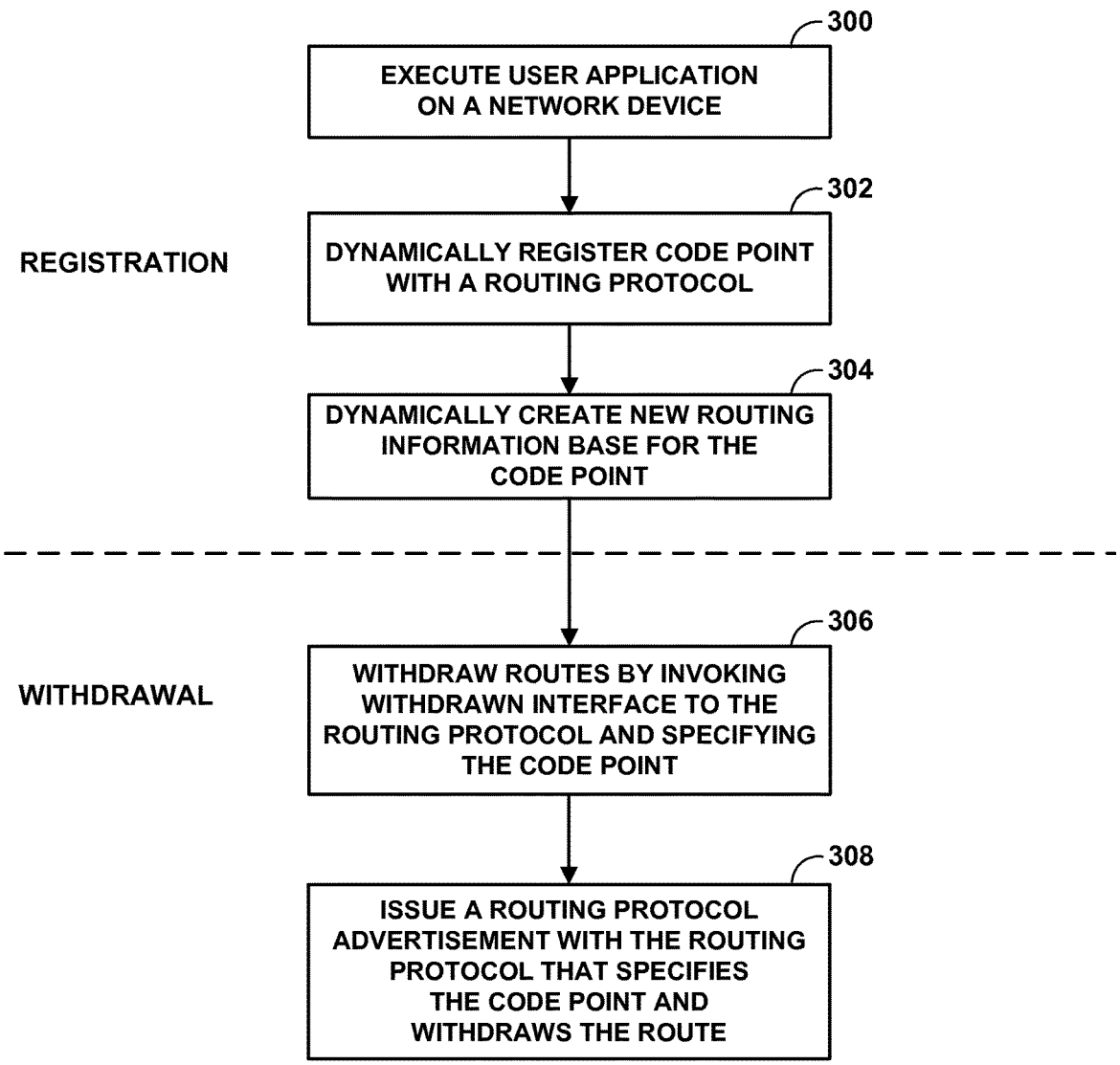
FIG. 6 is a block diagram illustrating an example mode of operation for a network device to dynamically register a new address family for a routing protocol and use the new address family to withdraw prefixes according to techniques described herein.

FIG. 6 is a block diagram illustrating an example mode of operation for a network device to dynamically register a new address family for a routing protocol and use the new address family to withdraw prefixes according to techniques described herein. The mode of operation is described with respect to router 30 of FIG. 2.

User application 47A may represent a third-party or vendor-supplied user process executing on control plane 34A components of router 30 (300). During a registration phase, user application 47A invokes a BGP interface 52 of an RP module 44 to dynamically register a address family identifier with a routing protocol, such as BGP (302). BGP interface 52, in response, dynamically creates a new routing information base (e.g., RIB 62A) to store, for instance, application data received in routing protocol advertisements that specify the address family identifier (304).

The address family identifier being registered, user application 47A may then withdraw routes from the routing protocol by invoking a withdraw interface of BGP interface 52 by specifying the address family identifier and a route to withdraw (306). RP module 44 encapsulates withdrawn routes to send to other network devices in BGP UPDATE messages that specify the address family identifier and withdraw the route for the address family identifier (308).

Figure 7:
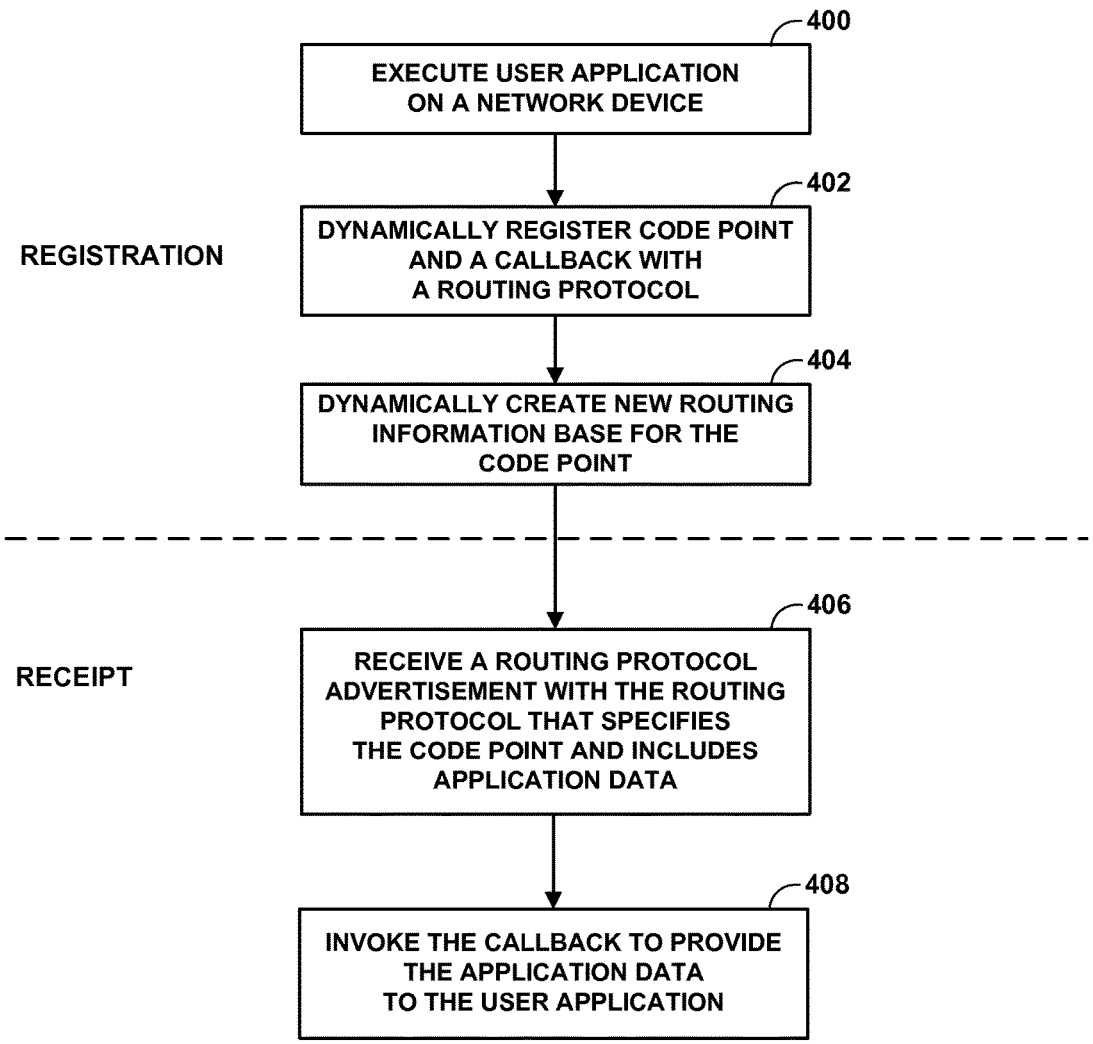
FIG. 7 is a block diagram illustrating an example mode of operation for a network device to dynamically register a new address family for a routing protocol and publish received application data to a registering application using a callback, in accordance with techniques described herein.

FIG. 7 is a block diagram illustrating an example mode of operation for a network device to dynamically register a new address family for a routing protocol and publish received application data to a registering application using a callback, in accordance with techniques described herein. The mode of operation is described with respect to router 30 of FIG. 2.

User application 47A may represent a third-party or vendor-supplied user process executing on control plane 34A components of router 30 (400). During a registration phase, user application 47A invokes a BGP interface 52 of an RP module 44 to dynamically register an address family identifier and a callback to a user application 47A routine with a routing protocol, such as BGP (402). BGP interface 52, in response, dynamically creates a new routing information base (e.g., RIB 62A) to store, for instance, application data received in routing protocol advertisements that specify the address family identifier (404).

RP module 44 receives a routing protocol advertisement the specifies the registered address family identifier and include application data (406). RP module 44 queries address family configuration data using the address family identifier (e.g., a combination of AFI/SAFI values) to identify the registered callback, and RP module 44 invokes the callback to pass the received application data to user application 47A (408).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   dynamically registering, by an application executing on a network device and via an interface of a routing protocol process executing on the network device, a new address family identifier that identifies application data for the application;
   receiving, by a management interface process via an interface of the management interface process, a display function for the new address family identifier;
   receiving, by the routing protocol process from a peer network device, a routing protocol advertisement according to a routing protocol, wherein the routing protocol advertisement includes data and includes the new address family identifier to identify the data as application data for the application;
   formatting, by the management interface process according to the display function for the new address family identifier, the data to generate formatted data; and
   outputting, by the management interface process for display at a display device, the formatted data.

2. The method of claim 1,
   wherein the routing protocol comprises a Border Gateway Protocol, and
   wherein the new address family identifier comprises a combination of an Address Family Identifier and a Subsequent Address Family Identifier.

3. The method of claim 1,
   wherein the application comprises the management interface process, and
   wherein the application receives the new address family identifier from an administrator of the network device.

4. The method of claim 1, further comprising:
   by the routing protocol process in response to receiving the new address family identifier from the application via the interface of the routing protocol process, dynamically creating a new database for the application and associating the new address family identifier with the new database.

5. The method of claim 4, further comprising:
   storing, by the routing protocol process in response to mapping the new address family identifier included in the routing protocol advertisement to the new database, the data to the new database.

6. The method of claim 1, wherein receiving the display function for the new address family identifier comprises receiving the display function from the application.

7. The method of claim 1, wherein receiving the display function for the new address family identifier comprises receiving the display function from an administrator.

8. A method comprising:
   dynamically registering, by a network device during run-time operation of the network device and via an interface of the network device, a new address family identifier that identifies application data for an application;
   receiving, by the network device, a display function for the new address family identifier;
   receiving, by the network device from a peer network device, a routing protocol advertisement according to a routing protocol, wherein the routing protocol advertisement includes data and includes the new address family identifier to identify the data as application data for the application;
   formatting, by the network device according to the display function for the new address family identifier, the data to generate formatted data; and
   outputting, by the network device, the formatted data.

9. A network device comprising:
a memory;
at least one processor coupled to the memory;
a routing protocol process configured for execution by the at least one processor; an application configured for execution by the at least one processor to dynamically register, via an interface of the routing protocol process, a new address family identifier that identifies application data for the application; and
a management interface process configured for execution by the at least one processor to receive, via an interface of the management interface process, a display function for the new address family identifier,
wherein the routing protocol process is further configured to receive, from a peer network device, a routing protocol advertisement according to a routing protocol, wherein the routing protocol advertisement includes data and includes the new address family identifier to identify the data as application data for the application,
wherein the management interface process is further configured to format, according to the display function for the new address family identifier, the data to generate formatted data, and
wherein the management interface process is further configured to output, for display at a display device, the formatted data.

10. The network device of claim 9,
wherein the routing protocol comprises a Border Gateway Protocol, and
wherein the new address family identifier comprises a combination of an Address Family Identifier and a Subsequent Address Family Identifier.

11. The network device of claim 9,
wherein the application comprises the management interface process, and
wherein the application is configured to receive the new address family identifier from an administrator of the network device.

12. The network device of claim 9,
wherein the routing protocol process is configured to, in response to receiving the new address family identifier from the application via the interface of the routing protocol process, dynamically create a new database for the application and associate the new address family identifier with the new database.

13. The network device of claim 12,
wherein the routing protocol process is further configured to store, in response to mapping the new address family identifier included in the routing protocol advertisement to the new database, the data to the new database.

14. The network device of claim 9, wherein to receive the display function for the new address family identifier the management interface process is configured to receive the display function from the application.

15. The network device of claim 9, wherein to receive the display function for the new address family identifier the management interface process is configured to receive the display function from the administrator.

16. A non-transitory computer-readable medium comprising instructions for causing one or more programmable processors of a network device to:
dynamically register, by an application via an interface of a routing protocol process, a new address family identifier that identifies application data for the application;
receive, by a management interface process via an interface of the management interface process, a display function for the new address family identifier;
receive, by the routing protocol process from a peer network device, a routing protocol advertisement according to a routing protocol, wherein the routing protocol advertisement includes data and includes the new address family identifier to identify the data as application data for the application;
format, by the management interface process according to the display function for the new address family identifier, the data to generate formatted data; and
output, by the management interface process for display at a display device, the formatted data.

17. The non-transitory computer-readable medium of claim 16,
wherein the routing protocol comprises a Border Gateway Protocol, and
wherein the new address family identifier comprises a combination of an Address Family Identifier and a Subsequent Address Family Identifier.

18. The non-transitory computer-readable medium of claim 16,
wherein the application comprises the management interface process, and
wherein the application receives the new address family identifier from an administrator of the network device.

19. The non-transitory computer-readable medium of claim 16, wherein the instructions further the one or more programmable processors to:
by the routing protocol process in response to receiving the new address family identifier from the application via the interface of the routing protocol process, dynamically create a new database for the application and associate the new address family identifier with the new database.

20. The non-transitory computer-readable medium of claim 19, wherein the instructions further the one or more programmable processors to:
store, by the routing protocol process in response to mapping the new address family identifier included in the routing protocol advertisement to the new database, the data to the new database.

* * * * *